No. 894,676. PATENTED JULY 28, 1908.
R. A. MASON.
PNEUMATIC TIRE PROTECTOR.
APPLICATION FILED SEPT. 9, 1907.
2 SHEETS—SHEET 1.
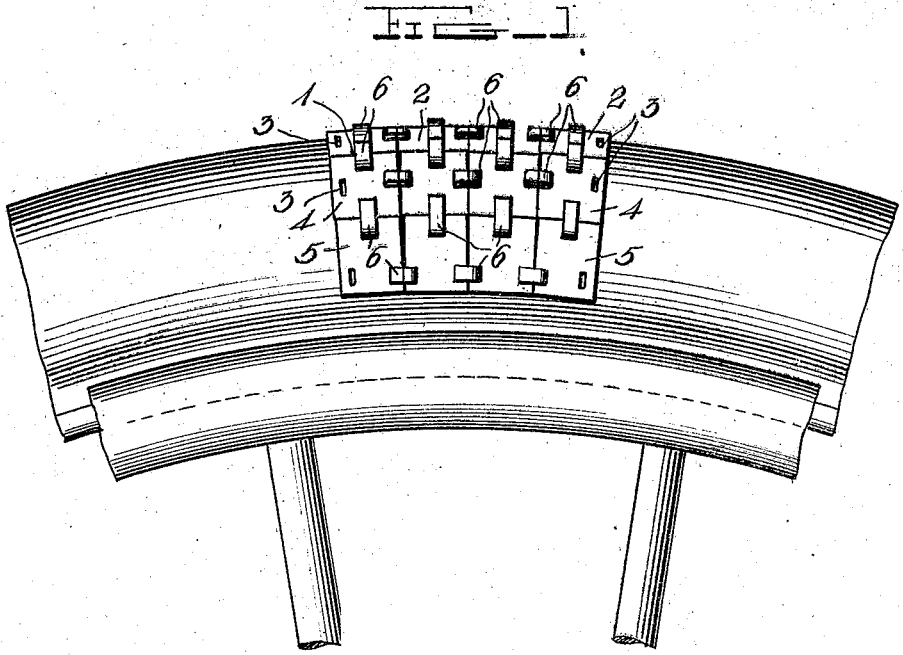
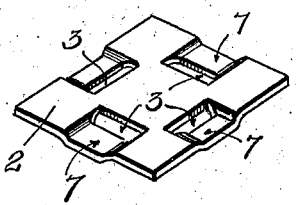
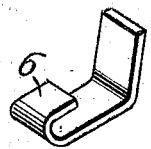
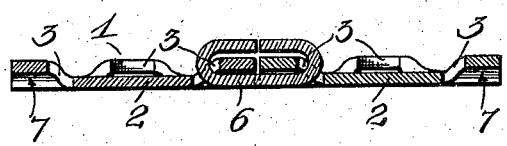
Witnesses
C. H. Griesbauer
Inventor
Rufus A. Mason
by H. B. Willson & Co.
Attorneys No. 894,676. PATENTED JULY 28, 1908.
R. A. MASON.
PNEUMATIC TIRE PROTECTOR.
APPLICATION FILED SEPT. 9, 1907.
2 SHEETS—SHEET 2.
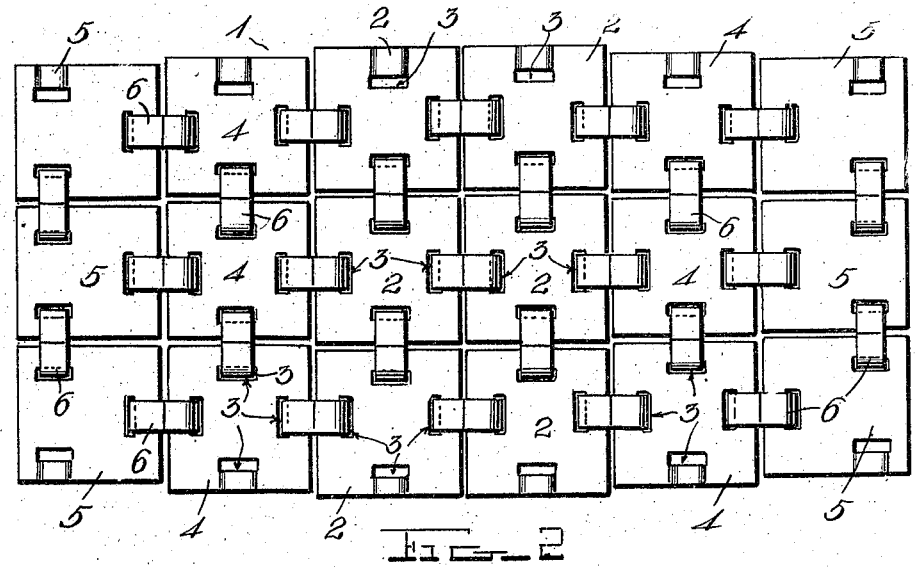
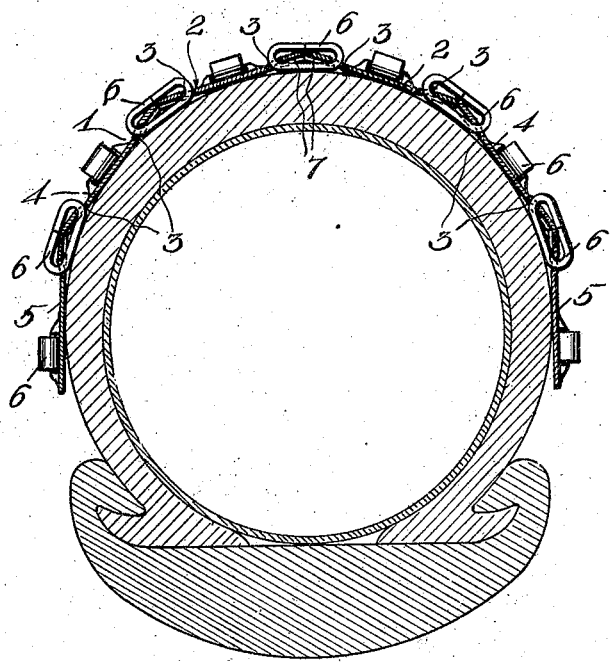
Witnesses
Inventor
Rufus A. Mason
by H. B. Willson & Co.
Attorneys

UNITED STATES PATENT OFFICE.

RUFUS A. MASON, OF NEW MARKET, IOWA.

PNEUMATIC-TIRE PROTECTOR.

No. 894,676.

Specification of Letters Patent.

Patented July 28, 1908.

Application filed September 9, 1907. Serial No. 392,019.

*To all whom it may concern:*

Be it known that I, RUFUS A. MASON, a citizen of the United States, residing at New Market, in the county of Taylor and State of Iowa, have invented certain new and useful Improvements in Pneumatic-Tire Protectors; and I do declare the following to be a full, clear, and exact description of the invention, such as will enable others skilled in the art to which it appertains to make and use the same.

This invention relates to improvements in pneumatic tire protectors.

The object of the invention is to provide a flexible, metallic armor or protector for tires, so constructed as to entirely cover and protect the tire, without interfering with the yielding of the latter under pressure.

With the foregoing and other objects in view, the invention consists of certain novel features of construction, combination and arrangement of parts, as will be more fully described and particularly pointed out in the appended claims.

In the accompanying drawings: Figure 1 is a side view of a portion of a wheel and tire showing the application of the protector thereto. Fig. 2 is a cross-sectional view through the tire with the protector arranged thereon. Fig. 3 is a plan view of a portion of the protector. Fig. 4 is a detailed perspective view of one of the plates of which the protector is formed. Fig. 5 is a similar view of one of the links, by means of which the plates are connected; and Fig. 6 is a detailed sectional view of two armor plates showing the manner in which they are connected together by the links to provide a smooth surface on the under side of the armor or protector.

Referring more particularly to the drawings, 1 denotes the armor or protector which is made up of a plurality of rectangularly shaped armor plates, suitably linked together to form a continuous flexible covering, which is adapted to be applied to the outer side of the tire to prevent the same from being cut or punctured. The rows of plates, 2, which form the central portion of the protector or armor, are provided adjacent to each edge with a rectangular shaped aperture, 3. The plates, 4, forming the adjacent rows, are somewhat smaller in size to the central plates, 2, and are provided with similar apertures, 3. The plates, 5, which form the outer rows of the protector, are somewhat smaller than the plates forming the rows, 3, the plates, 5, being provided with apertures, 3, only on those edges of the same which are in engagement with the next adjacent plates, the outer edges of the plates, 5, being disposed next to the rim of the wheel or not provided with apertures.

The plates 2, 4 and 5 are loosely connected together by means of flat metal links, 6, which are inserted through the apertures, 3, therein from the inner side of the plates, and are bent over on the outer sides thereof, until the ends of said links meet. The plates, when thus connected together, form a flexible shield or armor which may be readily engaged with the tire of the wheel, and will conform to the shape thereof, by reason of gradual reduction in the sizes of the plates along the outer edges of the protector.

It will be noted, that the portion of the metal between each of the apertures, 3, and the adjacent edges of the plates, is struck out or offset, so that recesses or depressions, 7, are formed opposite to each of the apertures, 3, on the under or inner sides of the plates to provide for the accommodation of the links, 6, whereby when the latter are engaged with the plates to couple the same together, a practically smooth even surface is formed on the inner side of the protector, thus preventing friction or wear on the tire which would be occasioned by the links, should they project below the inner surface of the plates. This construction of the plates, and arrangement of the links causes the latter to project to a considerable distance on the outer sides of the plates, and thus form obstructions, which enable the wheel to obtain a firm engagement with the ground and prevent the slipping around of the same, and also prevent lateral slipping or skidding of the wheel.

The armor or protector can be made of various sizes to fit larger or smaller tires by increasing or decreasing the number of plates, or by varying the size of the same. When applying the armor or protector to a tire, the latter is deflated and after said protector has been arranged thereon, the tire is again inflated, and when filled out will prevent the protector from becoming casually removed therefrom.

Having thus described my invention, what I claim as new and desire to secure by Letters-Patent, is:

A pneumatic tire protector, comprising a series of plates having formed therein oppositely disposed apertures between which and the adjacent edge of the plate the metal is offset to form recesses or depressions on the inner sides of the plates, and a series of links adapted to be engaged to said apertures and depressed portions of the plates, whereby said links form projections or obstructions on the outer surface of the protector, while the inner surface of the latter is smooth or unobstructed, substantially as described.

In testimony whereof I have hereunto set my hand in presence of two subscribing witnesses

RUFUS A. MASON.

Witnesses:
DON C. MASON,
ARTHUR C. SWEENEY.